(12) United States Patent
Green et al.

(10) Patent No.: US 7,807,743 B2
(45) Date of Patent: Oct. 5, 2010

(54) COATING COMPOSITION AND FILM SYSTEM THEREFROM

(75) Inventors: Marvin L Green, Brighton, MI (US); Donald H. Campbell, Hartland, MI (US); John E. Boisseau, Bloomfield Hills, MI (US); Bruce Oermann, Clinton Township, MI (US)

(73) Assignee: BASF Corporation, Southfield, MI (US)

( * ) Notice: Subject to any disclaimer, the term of this patent is extended or adjusted under 35 U.S.C. 154(b) by 912 days.

(21) Appl. No.: 11/534,352

(22) Filed: Sep. 22, 2006

(65) Prior Publication Data

US 2008/0076868 A1 Mar. 27, 2008

(51) Int. Cl.
*C09B 67/00* (2006.01)

(52) U.S. Cl. ...................... 524/502; 524/556

(58) Field of Classification Search .................. 524/502, 524/556
See application file for complete search history.

(56) References Cited

U.S. PATENT DOCUMENTS

| | | | |
|---|---|---|---|
| 3,645,977 A * | 2/1972 | Wolgemuth et al. ......... 525/119 |
| 5,593,733 A | 1/1997 | Mayo | |
| 5,593,785 A * | 1/1997 | Mayo et al. ............... 428/423.1 |
| 5,646,214 A | 7/1997 | Mayo | |
| 5,693,723 A | 12/1997 | Green | |
| 5,693,724 A | 12/1997 | Green | |
| 5,852,136 A | 12/1998 | Green | |
| 5,872,195 A | 2/1999 | Green et al. | |
| 5,994,479 A | 11/1999 | Green et al. | |
| 6,117,931 A | 9/2000 | Rehfuss et al. | |
| 6,239,212 B1 | 5/2001 | Green | |
| 6,331,596 B1 | 12/2001 | Ramesh et al. | |
| 6,420,472 B1 | 7/2002 | Rehfuss et al. | |
| 6,462,144 B1 | 10/2002 | Ramesh et al. | |
| 6,531,560 B1 | 3/2003 | Campbell et al. | |
| 6,541,594 B2 | 4/2003 | Ohrbom et al. | |
| 6,696,159 B2 | 2/2004 | Campbell et al. | |
| 6,696,535 B2 | 2/2004 | Campbell et al. | |
| 6,855,789 B2 | 2/2005 | Campbell et al. | |
| 6,858,693 B2 | 2/2005 | Campbell et al. | |
| 6,861,150 B2 | 3/2005 | Ramesh et al. | |
| 6,962,730 B2 | 11/2005 | Ohrbom et al. | |
| 7,087,683 B2 * | 8/2006 | Hu et al. ...................... 525/509 |
| 2004/0236031 A1 | 11/2004 | Ohrbom et al. | |
| 2005/0197449 A1 | 9/2005 | Ramesh et al. | |
| 2005/0197451 A1 | 9/2005 | Ramesh et al. | |
| 2005/0197473 A1 | 9/2005 | Ramesh et al. | |

* cited by examiner

*Primary Examiner*—David Wu
*Assistant Examiner*—Michael M Bernshteyn
(74) *Attorney, Agent, or Firm*—Howard & Howard Attorneys PLLC

(57) ABSTRACT

A coating composition is used to form a clearcoat layer of a film system including a basecoat layer and the clearcoat layer. The coating composition includes a carbamate functional polymer, a cross-linking agent reactive with the carbamate functional polymer, and an acid functional polymer substantially non-reactive with the carbamate functional polymer and the cross-linking agent. The acid functional polymer has an acid value of at least 50 mg KOH/g and contributes to an increased resistance to acid etch of the clearcoat layer. The acid functional polymer also contributes to an increased intercoat adhesion of the basecoat layer and the clearcoat layer thereby decreasing a possibility of separation/delamination of the basecoat layer and the clearcoat layer.

34 Claims, No Drawings

COATING COMPOSITION AND FILM SYSTEM THEREFROM

FIELD OF THE INVENTION

The present invention relates to a coating composition including an acid functional polymer that has an acid value of at least 50 mg KOH/g. The present invention also relates to a film system including a basecoat layer and a clearcoat layer formed from the coating composition.

DESCRIPTION OF THE RELATED ART

Coating compositions that include acid functional polymers are well known in the art. The acid functional polymers typically increase a resin dispersion in waterborne coating compositions or act as cross-linkers in carboxy-epoxy coating compositions. Yet, the acid functional polymers are not typically utilized in coating compositions that include carbamate functional polymers and have not been shown to increase a resistance to acid etch of cured coating compositions that include carbamate functional polymers.

Coating compositions that include carbamate functional polymers and cross-linking agents that are reactive with the carbamate functional polymers are also well known in the art. These coating compositions are particularly desirable for use in automobile paint applications as they can be cured to form clearcoat and basecoat (paint) layers which may serve as topcoat layers and exhibit durability, hardness, and uniform appearance. However, the topcoat layers may be susceptible to acid etching from acid rain. The acid rain can also hydrolyze exposed ether bonds formed between any hydroxyl functional polymer sites present, such as those in the carbamate functional polymers, and the cross-linking agents. When this occurs, defects (e.g., blemishes and spots) are formed in the clearcoat layers and are not easily removed. Additionally, many repair basecoat/clearcoat layers are particularly susceptible to delamination from underlying basecoat/clearcoat layers as they exhibit a reduced intercoat adhesion with the basecoat layers, resulting in poor durability and hardness and inconsistent appearance.

In the past, efforts have been made to improve both resistance to acid etch and the intercoat adhesion of clearcoat layers to improve their usefulness and to improve the commercial desirability of purchasing the coating compositions used to form the clearcoat layers. One such effort, disclosed in U.S. Pat. No. 5,593,785 to Mayo et al., discloses a film-forming composition that includes a dual resin system and a cross-linking agent. The dual resin system includes a carbamate-functional acrylic polymer and a polyester polymer, while the cross-linking agent is an aminoplast. In this dual-resin system, the cross-linking agent reacts (i.e., cross-links) with both the carbamate-functional acrylic polymer and the polyester to form the clearcoat layer. Specifically, the polyester of the '785 patent has a variable molecular weight, in both weight and number average, a variable functionality, and a wide polydispersity. These characteristics, and especially the carbamate functionality, negatively affect the polyester polymer and do not allow the polyester polymer to function as a separate, mobile, and non-reactive acid functional polymer. As such, the polyester polymer must be used in increased amounts as a reactant in the dual-resin system, as compared to any amounts of a separate, mobile, and non-reactive acid functional polymer that could be used as an additive.

Accordingly, there remains an opportunity to form a coating composition including an acid functional polymer that has a particular acid value. There also remains an opportunity to form a coating composition that, when cured, improved resistance to acid etch. There also remains an opportunity to form a film system that includes a basecoat layer and a clearcoat layer formed from the coating composition having improved intercoat adhesion between the clearcoat layer and the basecoat layer.

SUMMARY OF THE INVENTION AND ADVANTAGES

The present invention provides a coating composition including a carbamate functional polymer (A), and a cross-linking agent (B) reactive with the carbamate functional polymer (A). The coating composition also includes an acid functional polymer (C) that is substantially non-reactive with the carbamate functional polymer (A) and the cross-linking agent (B). The acid functional polymer (C) has an acid value of at least 50 mg KOH/g. The present invention also provides a film system including a basecoat layer and a clearcoat layer formed from the coating composition once cured.

The acid functional polymer (C) contributes to an increased resistance to acid etch of the clearcoat layer in a cost effective manner. The increased resistance to acid etch reduces a potential of formation of defects in the clearcoat layer due to acid rain, thereby improving the appearance and usefulness of the clearcoat layer and the commercial desirability of purchasing the coating composition used to form the clearcoat layer. The acid functional polymer (C) also contributes to an increased intercoat adhesion of the basecoat layer and the clearcoat layer. The increased intercoat adhesion decreases a possibility of separation/delamination of the clearcoat layer from the basecoat layer resulting in increased durability, hardness, and appearance of both the clearcoat layer and the basecoat layer. The acid functional polymer (C) further contributes to leveling of the coating composition during application, flashing, and cure.

DETAILED DESCRIPTION OF A PREFERRED EMBODIMENT

The present invention provides a coating composition that may be water-borne or solvent-borne. Preferably, the coating composition is solvent borne and has a water content of less than 1% by weight. The coating composition includes a carbamate functional polymer (A), a cross-linking agent (B) reactive with the carbamate functional polymer (A), and an acid functional polymer (C) that is substantially non-reactive with the carbamate functional polymer (A) and the cross-linking agent (B). The cross-linking agent (B) and the acid functional polymer (C) are described in greater detail below. The present invention also provides a film system that includes a basecoat layer and a clearcoat layer formed from the coating composition once cured, each also described in greater detail below.

The carbamate functional polymer (A) may be any carbamate functional polymer (A) known in the art. The carbamate functional polymer (A) includes at least one carbamate functional group and may include more than one carbamate functional group. For descriptive purposes only, a chemical structure of the carbamate functional group is illustrated below.

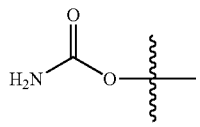

The carbamate functional polymer (A) may also include one or more functional groups selected from the group of esters, ethers, ketones, aldehydes, carboxylic acids, amides and ureas, acrylics, sulfur including groups, phosphorous including groups, silane including groups, and mixtures thereof. The carbamate functional polymer (A) may further include aliphatic, cycloaliphatic, and aromatic groups. In one embodiment, the carbamate functional polymer (A) includes a branched organic structure having various functionalities including, but not limited to, branched hydrocarbon functionality, hydroxyl functionality, carboxylate functionality, carbamate functionality, and ester functionality. Preferably, the carbamate functional polymer (A) has a number average molecular weight of 1,000 to 20,000, more preferably of 2,000 to 8,000, and most preferably of 3,000 to 5,000, g/mol. However, it is to be understood that the carbamate functional polymer (A) may have any molecular weight.

Preferably, the carbamate functional polymer (A) is included in an amount of 20 to 80, more preferably of from 30 to 70, and most preferably of 40 to 50, parts by weight per 100 parts by weight of the coating composition. However, the carbamate functional polymer (A) may be included in the coating composition in any amount.

The carbamate functional polymer (A) may also be formed by any process known in the art. In one embodiment, the carbamate functional polymer (A) is formed from a method that includes preparing a backbone polymer including one or more functional groups by addition, which includes polymerizing one or more ethylenically unsaturated carbamate free monomers and one or more nonfunctional ethylenically unsaturated monomers, and reacting the backbone polymer with one or more additional reactive compounds so as to produce the carbamate functional polymer (A) having at least one carbamate group, as disclosed in U.S. Pat. No. 6,696,535, hereby expressly incorporated by reference. In another embodiment, the carbamate functional polymer (A) is formed from a method as disclosed in U.S. Pat. No. 6,855,789, which is also hereby expressly incorporated by reference. In yet another embodiment, the carbamate functional polymer (A) includes the reaction product of a compound comprising a plurality of hydroxyl groups, at least one of which is formed from a ring-opening reaction of an epoxy group and an organic acid, and a compound including a carbamate group, as set forth in U.S. Pat. No. 6,420,472, which is further hereby expressly incorporated by reference. In yet another embodiment, the carbamate functional polymer (A) is a reaction product of a first compound having a plurality of hydroxyl groups, a primary carbamate compound, and a silyl compound having a terminal group reactive with hydroxyl groups and also having silylalkoxy groups. In a further embodiment, the carbamate functional polymer (A) is more specifically the reaction product of the first compound having the plurality of hydroxyl groups, a carboxylic acid anhydride, a second compound having at least one epoxy group, the primary carbamate compound, and the silyl compound having the terminal group reactive with hydroxyl groups and having silylalkoxy groups.

The coating composition may also include an additional carbamate functional compound, i.e., a carbamate functional modifier, that is different from the carbamate functional polymer (A), such as a carbamate functional resin, a carbamate functional oligomer, and other compounds. It is also contemplated that more than one additional carbamate functional compound may be included in the coating composition. The additional carbamate functional compound, like the carbamate functional polymer (A), may be any known in the art and may be formed by any method known in the art. The carbamate functional compound may also react with the cross-linking compound. If included, the carbamate functional compound is preferably included in an amount of 3 to 25, more preferably of 6 to 18, and most preferably of 10 to 14, parts by weight per 100 parts by weight of the coating composition. However, the carbamate functional compound may be included in the coating composition in any amount, as determined by one skilled in the art.

Referring now to the cross-linking agent (B), the cross-linking agent (B) is reactive with the carbamate functional polymer (A) and may be reactive with any additional carbamate functional compounds, as first introduced above. In one embodiment, the cross-linking agent (B) includes a melamine formaldehyde resin. In another embodiment, the cross-linking agent (B) includes monomeric and polymeric melamine formaldehyde resins, including both partially and fully alkylated melamines such as methylated melamines, butylated melamines, and methylated/butylated melamines. In yet another embodiment, the cross-linking agent (B) includes a first and a second melamine formaldehyde resin. In this embodiment, the first melamine formaldehyde resin is present in an amount of 2.5 to 4.5 parts by weight per 100 parts by weight of the coating composition and is a fully methylated melamine. As such, the first melamine formaldehyde resin includes alkoxymethyl groups of the general formula —$CH_2OR_1$, where $R_1$ is an alkyl chain having from 1 to 20 carbon atoms. The most preferred first melamine formaldehyde resin in this embodiment is hexamethoxymethyl melamine and is commercially available from Cytec Industries of Wallingford, Conn. Also in this embodiment, the second melamine formaldehyde resin is present in an amount of 2.5 to 20 parts by weight and is a partially methylated melamine. As such, the second melamine formaldehyde resin may include both a methylol group, $CH_2OH$, and alkoxymethyl groups, —$CH_2OR_1$, as defined above. In this embodiment, the weight ratio of the first melamine formaldehyde resin to the second melamine formaldehyde resin is from 1:5 to 5:1 and more preferably from 1:2 to 2:1. It is contemplated that the cross-linking agent (B) may be any known in the art.

In another embodiment, the cross-linking agent (B) is selected from the group of aminoplasts, phenolic adducts, siloxanes, silanes, alkylols, isocyanates, acrylics, anhydrides, and combinations thereof. A non-limiting example of a suitable aminoplast, in addition to the melamine formaldehyde resins described above, includes a urea formaldehyde resin. A non-limiting example of a siloxane includes trimethoxy siloxane. Non-limiting examples of alkylols include methylol ureas. Non-limiting examples of isocyanates include aliphatic and aromatic isocyanates, and modified polyisocyanates including ureas, biurets, allophanates, carbodiimides, uretonimines, and isocyanurate and/or urethane groups including diisocyanates and/or polyisocyanates such as modified diphenylmethane diisocyanates. The isocyanate may be a blocked or an unblocked polyisocyanate. Non-limiting examples of suitable blocking agents include those materials that unblock at elevated temperatures such as caprolactam. Other suitable blocking agents include, but are not limited to, phenol, cresols, isononylphenol, oximes such as methyl-ethyl ketoxime and butanone oxime, active methylene group-containing compounds, such as diethylmalonate and isopropylidene malonate, the acetoacetates, and sodium bisulfite. A non-limiting example of an anhydride includes polysuccinic anhydride.

Preferably, the cross-linking agent (B) is present is included in an amount of 0.5 to 15, and more preferably of 5 to 9, parts by weight per 100 parts by weight of the coating composition. Yet, it is to be understood that the cross-linking agent (B) may be present in the coating composition in any amount, as determined by one skilled in the art.

The coating composition also includes the acid functional polymer (C) that is substantially non-reactive with the carbamate functional polymer (A) and the cross-linking agent (B), as first introduced above. For purposes of the present invention, the terminology "substantially non-reactive" includes a typical reaction of carbamate to melamine or hydroxyl to melamine which is insignificant and unnecessary in contributing to crosslink density or cured $T_g$ required to achieve adequate physical properties. In one embodiment, the acid functional polymer (C) is totally non-reactive with both the carbamate functional polymer (A) and the cross-linking agent (B).

The acid functional polymer (C) may be any known in the art so long as the acid functional polymer (C) has an acid value of at least 50 mg KOH/g. It is also contemplated that the acid functional polymer (C) may have the ability to at least partially migrate to a surface of the composition and/or clearcoat layer. In one embodiment, the acid functional polymer (C) has an acid value of at least 120 mg KOH/g. In another embodiment, the acid functional polymer (C) has an acid value of at least 240 mg KOH/g. In yet another embodiment, the acid functional polymer (C) has an acid value of 240 to 250 mg KOH/g. Inclusion of the acid functional polymer (C) unexpectedly increases a resistance to acid etch of a cured film layer and/or the clearcoat layer formed from the coating composition. Inclusion also increases an intercoat adhesion of the cured film layer and/or the clearcoat layer with the basecoat layer. Additionally, inclusion reduces and preferably eliminates a need to include a leveling agent in the coating composition as the acid functional polymer (C) may also serve as the leveling agent. The acid functional polymer (C) has a precise molecular weight, but weight and number average, a narrow dispersion of functionality, and a narrow polydispersity. Each of these characteristics allow for precise tailoring of the acid functional polymer (C) to different applications, as determined by one skilled in the art and contribute to both the resistance to acid etch and the increased intercoat adhesion.

In one embodiment, the acid functional polymer (C) includes an acrylic polymer. The acrylic polymer may be any known in the art and may include an acrylic polyester. In another embodiment, the acid functional polymer (C) includes a polyalkylacrylate. Preferably, the polyalkylacrylate includes polybutylacrylate. In yet another embodiment, the acid functional polymer (C) includes a polyester polymer. In all embodiments, the acid functional polymer (C) may include any structure, so long as the acid value of the acid functional polymer (C) is at least 50 mg KOH/g. In one embodiment, the acid functional polymer (C) includes a star polyester including side chains of polyacrylate. In another embodiment, the acid functional polymer (C) includes a hybrid polyester copolymerized with a polybutylacrylate.

Preferably, the acid functional polymer (C) has a density of 1.02 to 1.05, and more preferably of 1.02 to 1.04, g/cm$^3$. The acid functional polymer (C) also preferably has a viscosity of 90 to 1,200, and more preferably of 180 to 200, MPa·s. at 25° C. The acid functional polymer (C) also preferably has a weight average molecular weight of 3,500 to 20,000, and more preferably of 5,500 to 20,000, g/mol, and a number average molecular weight of 1,500 to 6,500, and more preferably of 2,000 to 6,500, g/mol. The acid functional polymer (C) further preferably has a percent solids of 45 to 60, and more preferably of 49 to 59, percent. Preferably, the acid functional polymer (C) also has a refractive index of 1.4 to 1.5, more preferably of 1.44 to 1.46, and most preferably of 1.44 to 1.45. Further, the acid functional polymer (C) preferably has a pKa of from 4 to 6. However, it is to be understood that the acid functional polymer (C) may have any density, viscosity, molecular weight, percent solids, refractive index, and pKa so long as the acid functional polymer (C) has an acid value of at least 50 mg KOH/g.

Referring back to the coating composition, the coating composition may also include an additive polymer. If so, the additive polymer is different from the acid functional polymer (C). However, the aforementioned description of the acid functional polymer (C) may also apply to the additive polymer. In one embodiment, the additive polymer includes a polyacrylate commercially available from King Industries of Norwalk, Conn. under the trade name of Disparlon® LAP-20.

The coating composition preferably includes at least one catalyst to enhance curing. Preferably, when the cross-linking agent (B) includes the aminoplast, especially melamine, an acid catalyst may be utilized to enhance the curing. Such catalysts are well-known in the art and include, but are not limited to, p-toluenesulfonic acid, dinonylnaphthalene disulfonic acid, dodecylbenzenesulfonic acid, phenyl acid phosphate, monobutyl maleate, butyl phosphate, hydroxy phosphate ester, and combinations thereof. Other catalysts that may be useful in the coating composition of the invention include, but are not limited to, Lewis acids, transition metal salts such as zinc salts and tin salts, and combinations thereof. Typically, catalysts either: (1) lower a temperature required for the reaction between the carbamate functional polymer (A) and the cross-linking agent (B); or (2) raise a reaction rate of the reaction between the carbamate functional polymer (A) and the cross-linking agent (B), or both. In some instances, it may be desirable to lower the rate of reaction at ambient temperatures. The catalyst may be blocked, unblocked, or partially blocked. The catalyst may be blocked or partially blocked with an amine or other suitable blocking agent such as an oxirane modifying material. The amine, which is volatile, is a suitable blocking agent because the amine evaporates from the coating composition as it cures thereby unblocking the catalyst due to heat introduced by any conventional means, such as an oven, during cure. A suitable unblocked acid catalyst for use in the coating composition of the subject invention is sold by King Industries of Norwalk, Conn. under the trade name Nacure® 1051. If included, the catalyst is preferably included in an amount of 0.1 to 1.2, more preferably of 0.1 to 0.9, and most preferably of 0.2 to 0.7, parts by weight per 100 parts by weight of the coating composition.

The coating composition may further include at least one additive different from the additive polymer. The at least one additive may be selected from the group consisting of leveling agents, surfactants, fillers, stabilizers, solvents, plasticizers, defoaming agents, wetting additives, catalysts, rheology controlling agents, pigments, and combinations thereof. Non-limiting examples of suitable surfactants include Surfynol® Surfactants commercially available from Air Products and Chemicals, Inc. of Allentown, Pa. Suitable non-limiting examples of plasticizers include Coroc® Acrylic Plasticizer Resins commercially available from Cook Composites and Polymers of St. Louis, Mo.

If the coating composition includes the solvent as an additive, the solvent preferably dissolves the carbamate functional polymer (A), the cross-linking agent (B), and the acid functional polymer (C) to a substantial degree. The solvent can include any organic solvent and/or water. In one embodiment, the solvent includes a polar organic solvent. In another embodiment, the solvent includes a polar aliphatic solvent. In an additional embodiment, the solvent includes a polar aromatic solvent. In yet another embodiment, the solvent is selected from the group of a ketone, an ester, an acetate, an aprotic amide, an aprotic sulfoxide, an aprotic amine, and combinations thereof. Non-limiting examples of useful solvents include methyl ethyl ketone, methyl propyl ketone, methyl isobutyl ketone, m-amyl acetate, ethylene glycol butyl ether-acetate, propylene glycol monomethyl ether acetate, xylene, N-methylpyrrolidone, 2-ethylhexanol, n-butanol, dipropylene glycol methyl ether, SC 150 solvent commercially available from ExxonMobil of Irving, Tex., naptha, heavy benzene, ethyl ethoxypropionate, butylglycol acetate, butylglycol, blends of aromatic hydrocarbons, and combinations thereof.

If the coating composition includes the pigment as an additive, for example, when the coating composition is used to form the basecoat layer, the pigment may include organic and/or inorganic compounds, colored materials, fillers, metallic and/or inorganic flake materials such as mica or aluminum flake, and combinations thereof. Non-limiting examples of suitable pigments include a carbon black pigment, titanium dioxide and other inorganic colored pigments, such as iron oxide, chrome yellow, moly orange, titanium yellow, nickel titanate yellow, chrome greens, and the like.

If the coating composition includes the leveling agent as an additive, the leveling agent may include, but is not limited to, vinyl acrylic copolymers, hydroxyl functional polyether polysiloxanes, halogenated polysiloxanes, and combinations thereof. Illustrative commercially available examples of these types of leveling agents include, but are not limited to, Byk 373 (hydroxyl polyether polydimethyl polysiloxane) commercially available from Byk Chemie of Wesel, Germany, Disparlon® LC955 (vinyl acrylate copolymer) commercially available from Kyoeisha Chemical of Tokyo, Japan, Silwet® L-7614 (hydroxyl functional polyether modified polysiloxane) commercially available from Chemtura Corporation of Middlebury, Conn., and Addid® 761 (fluorinated polysiloxane) commercially available from Wacker Chemie AG of München, Germany.

If the coating composition includes the stabilizer as an additive, the stabilizer may include hindered amine light stabilizers (HALs). If included, the HALs may include any known in the art. Illustrative examples of commercially available HALs that are suitable for use in the present invention include, but are not limited to, Sanduvor® 3058 commercially available from Clariant Corporation of Charlotte, N.C., and Tinuvin® 292, commercially available from Ciba Specialty Chemicals Corporation of Basel, Switzerland.

The coating composition is preferably applied to a substrate, such as a body of a vehicle, and cured to form a cured film layer. The curable film layer, for purposes of the present invention, may be utilized as a primer layer, the basecoat layer, and/or the clearcoat layer, and may be applied at any film build thickness. Preferably, if the cured film layer is utilized as a clearcoat layer, it is applied at a film build thickness of 1.2 to 2.5, more preferably of 1.6 to 2.1, and most preferably of 1.8 to 2.0, mils. If the cured film layer is utilized as a clearcoat layer, the clearcoat layer preferably has gloss. In one embodiment, the clearcoat layer has a 20° gloss of 80 or more (ASTM D523-89) or a DOI (ASTM E430-91) of at least 80. Utilization of the curable film layer as the clearcoat layer will be described in further detail below.

The coating composition may be applied by any method known in the art. Suitable methods include, but are not limited to, spray coating, dip coating, roll coating, curtain coating, and combinations thereof. The substrate may be any suitable substrate known in the art. In one embodiment, the substrate includes automotive body panels. In another embodiment, the substrate is selected from the group of plastic, metals such as steel, iron, and aluminum, and combinations thereof. The substrate may be coated or uncoated, treated or untreated, and combinations of these. Most preferably, the substrate is primed or electrocoated, and includes automobile body panels.

After the coating composition is applied to the substrate, the substrate is preferably subjected to conditions so as to cure the coating composition and form the cured film layer, as first introduced above. Although various methods of curing may be used, heat-curing is preferred. Generally, heat curing is effected by exposing the substrate to elevated temperatures provided primarily by radiative heat sources. However, any type of curing may be utilized with the current invention. Preferably, the coating composition is cured at a temperature of 230° F. to 320° F. to form the cured film layer. If the coating composition includes a blocked acid catalyst, the coating composition is more preferably cured at a temperature of 250° F. to 300° F., and more preferably at a temperature of 275° F. to 285° F. to form the cured film layer. If the coating composition includes an unblocked acid catalyst, the coating composition is more preferably cured at a temperature of 180° F. to 220° F. to form the cured film layer.

The coating composition is preferably cured for a time of 10 to 60 minutes. However, if the coating composition includes the blocked acid catalyst, the coating composition is more preferably cured for a time of 15 to 25 minutes. If the coating composition includes the unblocked acid catalyst, the coating composition is more preferably cured for a time of 10 to 20 minutes.

After curing and formation of the cured film layer, the cured film layer preferably has a Jacksonville Etch of less than 7, more preferably of less than 5, even more preferably of 3 to 5, and most preferably of 3 or less, as determined by GM Material Specification #9984157. The present invention may also include a process for coating the substrate utilizing the coating composition.

The present invention also provides the film system including the basecoat layer and the clearcoat layer formed from the coating composition once cured, as first introduced above. The basecoat layer may include a polymer selected from the group of acrylics, vinyls, polyurethanes, polycarbonates, polyesters, alkyds, polysiloxanes, and combinations thereof. Preferred polymers include acrylics and polyurethanes. The polymer is crosslinkable and includes one or more type of cross-linkable functional groups. Such cross-linkable groups include, but are not limited to, hydroxy, isocyanate, amine, epoxy, acrylate, vinyl, silane, acetoacetate groups and combinations thereof. These cross-linkable groups may be masked or blocked in such a way so that they are unblocked and available for cross-linking under desired curing conditions, as also first described above. The present invention may also include the substrate having the film system applied thereon.

Referring now to the clearcoat layer, the clearcoat layer is preferably applied at a film build thickness of 1.2 to 2.5, more preferably of 1.6 to 2.1, and most preferably of 1.8 to 2.0, mils. The clearcoat layer also preferably has gloss. In one embodiment, the clearcoat layer has a 20° gloss of 80 or more (ASTM D523-89) or a DOI (ASTM E430-91) of at least 80, as first introduced above. The clearcoat layer also preferably has a Jacksonville Etch of less than 7, more preferably of less than 5, and most preferably of 3 to 5, as also first introduced above and as determined by GM Material Specification #9984157.

Referring now to the basecoat layer and the clearcoat layer, the basecoat layer and the clearcoat layer preferably have an intercoat adhesion up to a clearcoat film build of at least 1.6 mils to failure as determined by GM Test Number 9071P. In one embodiment, the basecoat layer and the clearcoat layer are utilized as repair and original layers, respectively, and have an intercoat adhesion of approximately 3.3, as also determined by GM Test Number 9071P. Preferably, the basecoat layer and the clearcoat layer have a percent adhesion of at least 95 percent, as further determined by GM Test Number 9071P. In one embodiment, the basecoat layer and the clearcoat layer have a percent adhesion of 95 to 100 percent. In yet another embodiment, the basecoat layer and the clearcoat layer have a percent adhesion of 100 percent.

The following examples illustrating the formation of and the use of the carbamate functional polymer (A), the cross-linking agent (B), and the acid functional polymer (C), of the present invention, as presented herein, are intended to illustrate and not limit the invention.

EXAMPLES

Four coating compositions, Coating Composition 1 through 4, are formulated according to the present invention. Two comparative coating compositions, Comparative Coating Compositions 1 and 2, are also formulated but do not include the Acid Functional Polymer (C) of the present invention. Each of the Coating Compositions 1 through 4 and the Comparative Coating Compositions 1 and 2, after formation, are utilized in forming clearcoat layers, Clearcoat Layers 1 through 4 and Comparative Clearcoat Layers 1 and 2, respectively. The Clearcoat Layers 1 through 4 and Comparative Clearcoat Layers 1 and 2 are evaluated for resistance to acid etch, and intercoat adhesion and percent adhesion, with the Basecoat Layers, described in greater detail below.

Example 1

To formulate the Coating Composition 1, the following parts are added to a suitable vessel equipped with agitation:

77.570 g of a high solids carbamate acrylic resin, made commercially by BASF Corporation of Southfield, Mich.;

25.030 g of a carbamated diol, made commercially by BASF Corporation of Southfield, Mich.;

34.510 g of butylated melamine formaldehyde resin, commercially available from BASF Corporation of Ludwigshafen, Germany, under the trade name of Luwipal® 018, as a Cross-Linking Agent (B);

0.400 g of an Acid Functional Polymer 1 having a solids percentage of 49.8%, an acid value of 248.6 mg KOH/g, a weight average molecular weight of 19,993 g/mol, and a number average molecular weight of 6,394 g/mol;

20.240 g of Aerosil® R972, a dispersion of 9.8% R972 in a 28% solid carbamated acrylic resin and a solvent, is commercially available from Degussa Corporation of Parsippany, N.J., as a First Additive;

10.000 g of Tinuvin® 384-2, commercially available from Ciba-Geigy Corporation of Ardsley, N.Y., as a Second Additive;

1.500 g of Tinuvin® 123, commercially available from Ciba-Geigy Corporation of Ardsley, N.Y., as a Third Additive; and 2.800 g of Nacure® 5225, commercially available from King Industries of Norwalk, Conn., as a Catalyst, as set forth in Table 1 below.

Example 2

To formulate the Coating Composition 2, the aforementioned parts used to form the Coating Composition 1 are utilized in the same manner except that 0.400 g of an Acid Functional Polymer 2 are substituted for the Acid Functional Polymer 1, as also set forth in Table 1 below. The Acid Functional Polymer 2 has a solids percentage of 58.3%, an acid value of 245.5 mg KOH/g, a weight average molecular weight of 6,940 g/mol, and a number average molecular weight of 3,100 g/mol.

Example 3

To formulate the Coating Composition 3, the aforementioned parts used to form the Coating Composition 1 are utilized in the same manner except that 0.400 g of an Acid Functional Polymer 3 are substituted for the Acid Functional Polymer 1, as further set forth in Table 1 below. The Acid Functional Polymer 3 has a solids percentage of 49.0%, an acid value of 121.3 mg KOH/g, a weight average molecular weight of 5,611 g/mol, a number average molecular weight of 2,300 g/mol, a viscosity of 191 MPa·s. at 25° C., a density of 1,027 g/cm$^3$, and a refractive index of 1.4482.

Example 4

To formulate the Coating Composition 4, the aforementioned parts used to form the Coating Composition 1 are utilized in the same manner except that 0.400 g of an Acid Functional Polymer 4 are substituted for the Acid Functional Polymer 1, as also set forth in Table 1 below. The Acid Functional Polymer 4 is an ionic acrylic copolymer having a density of 1.03 g/cm$^3$, a refractive index of 1.452, and an acid value of 80 mg KOH/g.

Comparative Example 1

To formulate the Comparative Coating Composition 1, the following parts are added to a suitable vessel equipped with agitation:

77.570 g of a high solids carbamate acrylic resin, made commercially by BASF Corporation of Southfield, Mich., as the Carbamate Functional Polymer (A);

25.030 g of a carbamated diol, made commercially by BASF Corporation of Southfield, Mich., as the Carbamate Functional Compound;

34.510 g of butylated melamine formaldehyde resin, commercially available from BASF Corporation of Ludwigshafen, Germany, under the trade name of Luwipal® 018, as the Cross-Linking Agent (B);

0.400 g of Disparlon®, commercially available from commercially available from Kyoeisha Chemical of Tokyo, Japan, as a Leveling Agent;

20.240 g of Aerosil® R972, commercially available from Degussa Corporation of Parsippany, N.J., as the First Additive;

10.000 g of Tinuvin® 384-2, commercially available from Ciba-Geigy Corporation of Ardsley, N.Y., as the Second Additive;

1.500 g of Tinuvin® 123, commercially available from Ciba-Geigy Corporation of Ardsley, N.Y., as the Third Additive; and 2.8 g of Nacure® 5225, commercially available from King Industries of Norwalk, Conn., as the Catalyst, as set forth in Table 1 below.

Comparative Example 2

To formulate the Comparative Coating Composition 2, the aforementioned parts used to form the Comparative Coating Composition 1 are utilized in the same manner except that 2.24 g of Nacure® 5225 are used as the Catalyst, as also set forth in Table 1 below. In Table 1, all parts are in grams.

TABLE 1

| Parts | Coating Composition 1 | Coating Composition 2 | Coating Composition 3 | Coating Composition 4 |
|---|---|---|---|---|
| Carbamate Functional Polymer (A) | 77.570 | 77.570 | 77.570 | 77.570 |
| Carbamate Functional Compound | 25.030 | 25.030 | 25.030 | 25.030 |
| Cross-Linking Agent (B) | 34.510 | 34.510 | 34.510 | 34.510 |
| Acid Functional Polymer 1 | .400 | 0 | 0 | 0 |
| Acid Functional Polymer 2 | 0 | 0.400 | 0 | 0 |
| Acid Functional Polymer 3 | 0 | 0 | 0.400 | 0 |
| Acid Functional Polymer 4 | 0 | 0 | 0 | 0.400 |
| Leveling Agent | 0 | 0 | 0 | 0 |
| First Additive | 20.240 | 20.240 | 20.240 | 20.240 |
| Second Additive | 10.000 | 10.000 | 10.000 | 10.000 |
| Third Additive | 1.500 | 1.500 | 1.500 | 1.500 |
| Catalyst | 2.800 | 2.800 | 2.800 | 2.800 |

| Parts | Comparative Coating Composition 1 | Comparative Coating Composition 2 |
|---|---|---|
| Carbamate Functional Polymer (A) | 77.570 | 77.570 |
| Carbamate Functional Compound | 25.030 | 25.030 |
| Cross-Linking Agent (B) | 34.510 | 34.510 |
| Acid Functional Polymer 1 | 0 | 0 |
| Acid Functional Polymer 2 | 0 | 0 |
| Acid Functional Polymer 3 | 0 | 0 |
| Acid Functional Polymer 4 | 0 | 0 |
| Leveling Agent | 0.400 | 0.400 |
| First Additive | 20.240 | 20.240 |
| Second Additive | 10.000 | 10.000 |
| Third Additive | 1.500 | 1.500 |
| Catalyst | 2.800 | 2.240 |

After formation of the Coating Compositions 1 through 4 and the Comparative Coating Compositions 1 and 2, 14.000 g of ethylene glycol monobutyl ether acetate, commercially available from Dow Chemical Company of Midland, Mich., as a First Solvent, and 10.100 g of Hi-Sol 10, commercially available from Ashland Inc. of Covington, Ky., as a Second Solvent, are added to each of the Coating Compositions 1 through 4 and the Comparative Coating Compositions 1 and 2. The First and Second Solvents are added in preparation for spraying each of the Coating Compositions 1 through 4 and the Comparative Coating Compositions 1 and 2 onto separate e-coated and primed ACT panels including the Basecoat Layers, first introduced above.

Specifically, to form the Basecoat Layers, the e-coated and primed ACT panels are sprayed with a white water-borne basecoat composition commercially available from BASF Corporation under the trade name of E54WW403, to a film build of 0 to 2.5 mils on a film build ladder. Subsequently, the panels are pre-baked in a conventional oven at a temperature of 300° F. and for a time of 90 minutes, thereby forming the Basecoat Layers. After formation of the Basecoat Layers, the Coating Compositions 1 through 4 and the Comparative Coating Compositions 1 and 2 are each individually sprayed onto different panels in the series to a film build of 0 to 2.5 mils on a film build ladder, and cured in a conventional oven at 275° F. for 25 minutes to form the Clearcoat Layers 1 through 4 and Comparative Clearcoat Layers 1 and 2, respectively. The Clearcoat Layers 1 through 4 and Comparative Clearcoat Layers 1 and 2 are then evaluated for resistance to acid etch (Jacksonville Etch) determined by GM Material Specification 9984157, Film Build to Failure of a total of the Basecoat Layers to the Clearcoat Layers (i.e., intercoat adhesion between the Clearcoat Layers 1 through 4 and Comparative Clearcoat Layers 1 and 2, with the Basecoat Layers), determined by GM Test Number 9071P, and Percent Adhesion determined by GM Test Number 9071P, as set forth in Table 2 below.

TABLE 2

| Parts | Clearcoat Layer 1 | Clearcoat Layer 2 | Clearcoat Layer 3 | Clearcoat Layer 4 |
|---|---|---|---|---|
| Jacksonville Etch | 3 | 3 | 4 | 4 |
| Film Build to Failure (mils) | 3.3 | 3.2 | 2.9 | 2.8 |
| Adhesion (%) | 98 | 100 | 96 | 100 |

| Parts | Comparative Clearcoat Layer 1 | Comparative Clearcoat Layer 2 |
|---|---|---|
| Jacksonville Etch | 5 | 6 |
| Film Build to Failure (mils) | 1.1 | 1.1 |
| Adhesion (%) | 30 | 30 |

As shown in Table 2, the Jacksonville Etch of the Clearcoat Layers 1 through 4 are lower than the Jacksonville Etch of the Comparative Clearcoat Layers 1 and 2, demonstrating that the Clearcoat Layers 1 through 4 are more resistant to acid etching, spotting, and blemishing from acid rain. As also shown in Table 2, the Film Build to Failure of the Clearcoat Layers 1 through 4 are higher than the Film Build to Failure of the Comparative Clearcoat Layers 1 and 2, demonstrating that the Clearcoat Layers 1 through 4 are more resistant to delamination and separation from the Basecoat Layers than the Comparative Clearcoat Layers 1 and 2. As further shown in Table 2, the Percent Adhesion of the Clearcoat Layers 1 through 4 are higher than the Percent Adhesion of the Comparative Clearcoat Layers 1 and 2, demonstrating that the Clearcoat Layers 1 through 4 exhibit an increased cohesion with the Basecoat Layers. These results indicate that the Clearcoat Layers 1 through 4 are suitable for commercial use in automobile paint applications while the Comparative Clearcoat Layers 1 and 2 are less suitable for use.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A coating composition comprising:
   A. a carbamate functional polymer;
   B. a cross-linking agent reactive with said carbamate functional polymer; and
   C. an acid functional polymer that is non-reactive with said carbamate functional polymer (A) and said cross-linking agent (B), said acid functional polymer having an acid value of at least 50 mg KOH/g.

2. A coating composition as set forth in claim 1 wherein said acid functional polymer (C) has an acid value of at least 120 mg KOH/g.

3. A coating composition as set forth in claim 1 wherein said acid functional polymer (C) has an acid value of at least 240 mg KOH/g.

4. A coating composition as set forth in claim 1 wherein said acid functional polymer (C) comprises an acrylic polymer.

5. A coating composition as set forth in claim 4 wherein said acrylic polymer comprises an acrylic polyester.

6. A coating composition as set forth in claim 1 wherein said acid functional polymer comprises a polyalkylacrylate.

7. A coating composition as set forth in claim 6 wherein said polyalkylacrylate comprises polybutylacrylate.

8. A coating composition as set forth in claim 1 wherein said acid functional polymer (C) comprises a polyester polymer.

9. A coating composition as set forth in claim 1 wherein said carbamate functional polymer (A) comprises the reaction product of;
   A. a compound comprising a plurality of hydroxyl groups, at least one of which is formed from a ring-opening reaction of an epoxy group and an organic acid, and
   B. a compound including a carbamate group.

10. A coating composition as set forth in claim 1 wherein said cross-linking agent (B) is selected from the group of aminoplasts, phenolic adducts, siloxanes, silanes, alkylols, isocyanates, acrylics, anhydrides, and combinations thereof.

11. A coating composition as set forth in claim 1 wherein said cross-linking agent (B) comprises a melamine formaldehyde resin.

12. A coating composition as set forth in claim 1 further comprising at least one catalyst in an amount of 0.1 to 0.9 parts by weight per 100 parts by weight of said coating composition.

13. A coating composition as set forth in claim 1 further comprising at least one additive selected from the group consisting of leveling agents, surfactants, fillers, stabilizers, solvents, plasticizers, defoaming agents, wetting additives, catalysts, rheology controlling agents, pigments, and combinations thereof.

14. A coating composition as set forth in claim 1 further comprising a carbamate functional compound different from said carbamate functional polymer (A).

15. A coating composition as set forth in claim 1 further comprising an additive polymer.

16. A coating composition as set forth in claim 1 which produces, upon cure, a cured film layer having a Jacksonville Etch of 3 to 5 as determined by GM Material Specification 9984157.

17. A coating composition as set forth in claim 1 that is solvent-borne.

18. A coating composition as set forth in claim 1 that is water-borne.

19. A process for coating a substrate utilizing said coating composition as set forth in claim 1.

20. A film system comprising a basecoat layer and a clearcoat layer formed from a coating composition once cured and comprises:
   A. the reaction product of;
      (i) a carbamate functional polymer, and
      (ii) a cross-linking agent reactive with said carbamate functional polymer; and
   B. an acid functional polymer that is substantially non-reactive with (i) said carbamate functional polymer, (ii) said cross-linking agent, and said reaction product of (i) and (ii), said acid functional polymer having an acid value of at least 50 mg KOH/g.

21. A film system as set forth in claim 20 wherein said acid functional polymer (B) has an acid value of at least 120 mg KOH/g.

22. A film system as set forth in claim 20 wherein said acid functional polymer (B) has an acid value of at least 240 mg KOH/g.

23. A film system as set forth in claim 20 wherein said acid functional polymer (B) comprises an acrylic polyester.

24. A film system as set forth in claim 20 wherein said acid functional polymer (B) comprises polybutylacrylate.

25. A film system as set forth in claim 20 wherein said carbamate functional polymer (i) comprises the reaction product of;
   A. a compound comprising a plurality of hydroxyl groups, at least one of which is formed from a ring-opening reaction of an epoxy group and an organic acid, and
   B. a compound including a carbamate group.

26. A film system as set forth in claim 20 wherein said cross-linking agent (ii) comprises a melamine formaldehyde resin.

27. A film system as set forth in claim 20 wherein said coating composition further comprises a carbamate functional compound different from said carbamate functional polymer (i).

28. A film system as set forth in claim 20 wherein said coating composition further comprises an additive polymer.

29. A film system as set forth in claim 20 wherein said clearcoat layer has a Jacksonville Etch of 3 to 5 as determined by GM Material Specification 9984157.

30. A film system as set forth in claim 20 wherein said basecoat layer and said clearcoat layer have an intercoat adhesion of at least 1.6 mils film build to failure as determined by GM Test Number 9071P.

31. A film system as set forth in claim 20 wherein said basecoat layer and said clearcoat layer have a percent adhesion of from 95 to 100, percent, as determined by GM Test Number 9071P.

32. A substrate having said film system of claim 20 applied thereon.

33. A film system as set forth in claim 20 wherein said basecoat layer is further defined as a waterborne basecoat layer.

34. A film system as set forth in claim 33 wherein said basecoat layer and said clearcoat layer have an intercoat adhesion of at least 1.6 mils film build to failure as determined by GM Test Number 9071P.

* * * * *